July 23, 1940.   E. L. GOLDSMITH   2,209,158
AUTOMATIC SPEED CONTROL FOR AUTOMOTIVE VEHICLES
Filed July 22, 1937   3 Sheets-Sheet 1
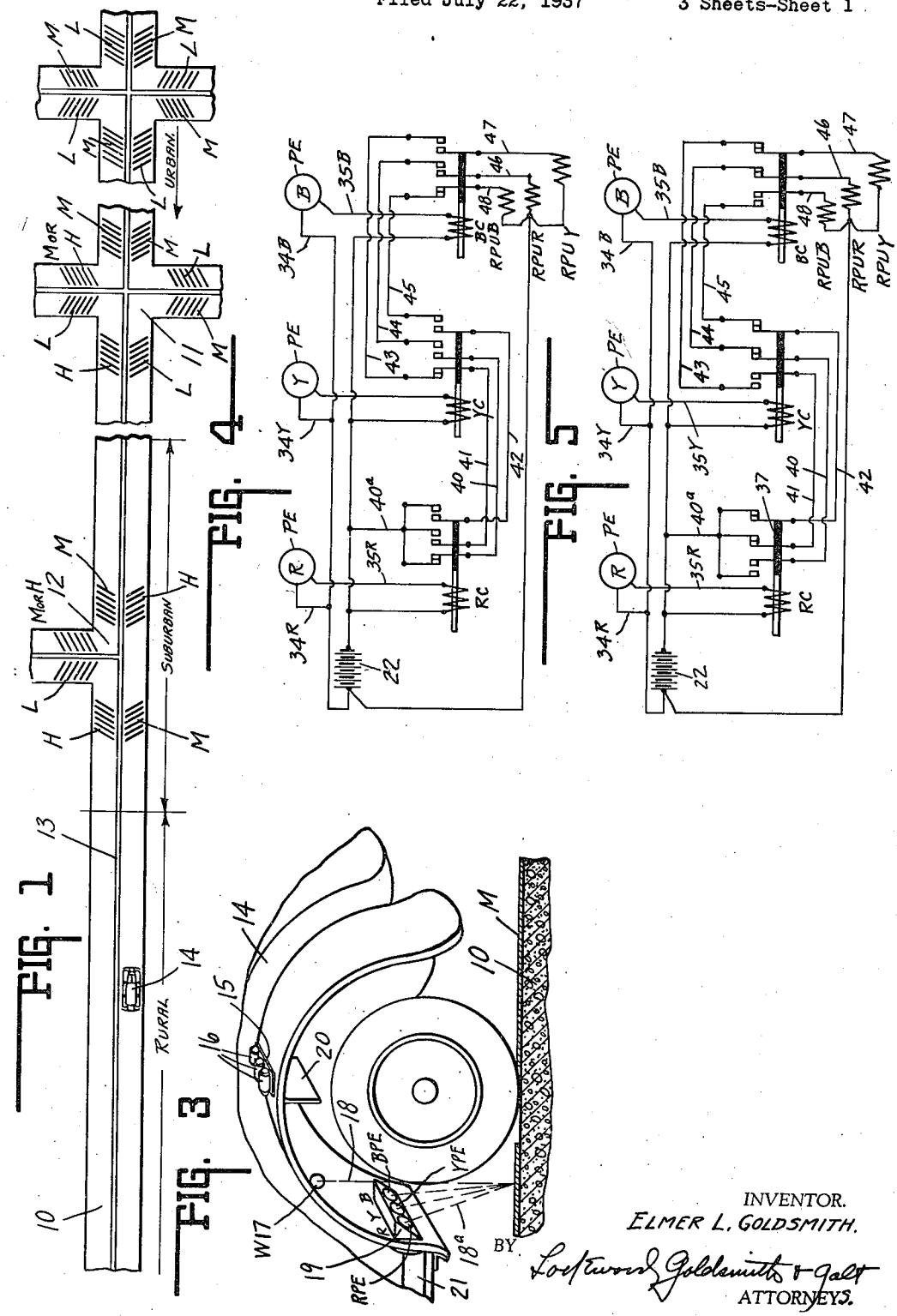
INVENTOR.
ELMER L. GOLDSMITH.
BY
ATTORNEYS.

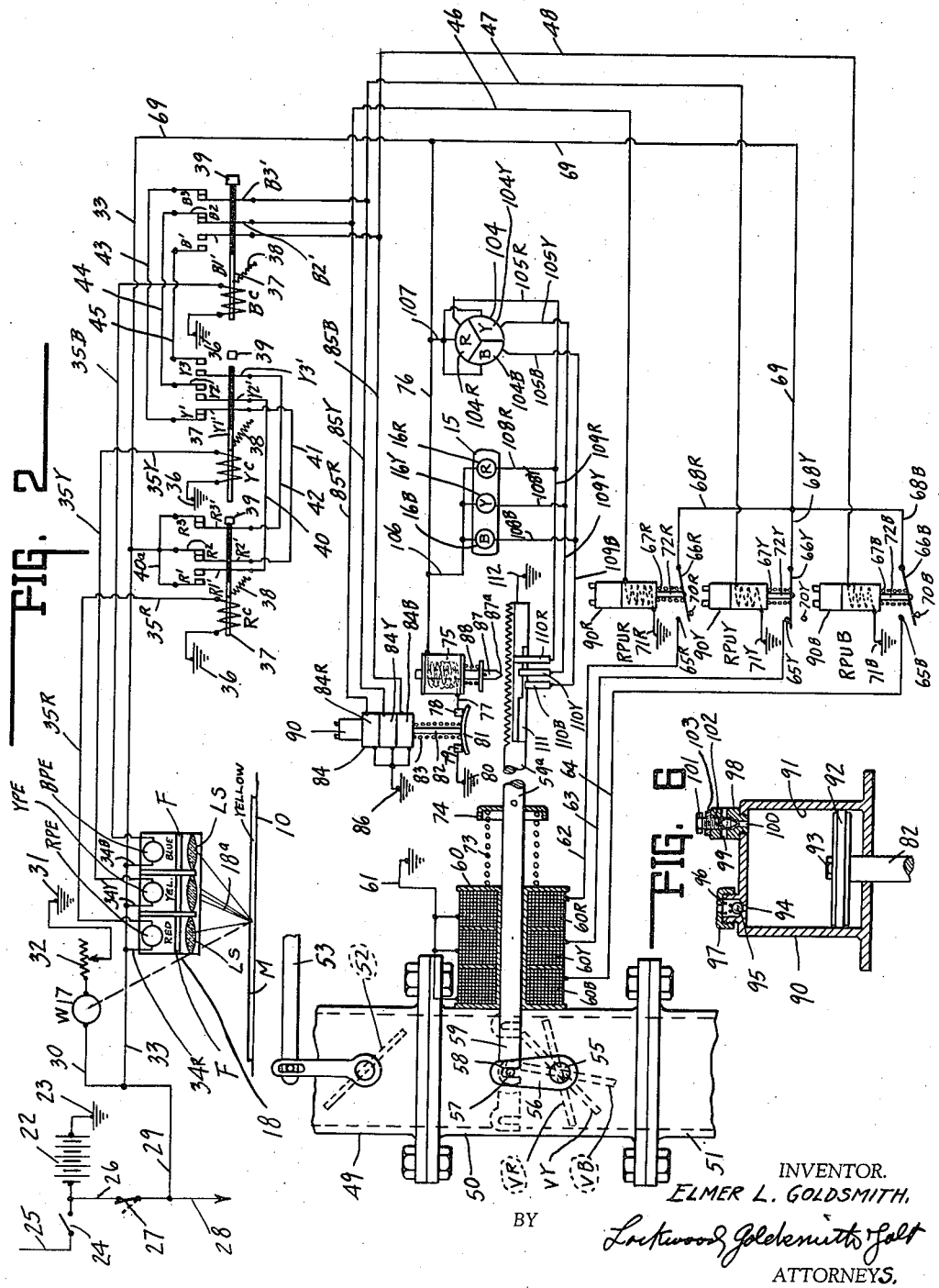

July 23, 1940.  E. L. GOLDSMITH  2,209,158
AUTOMATIC SPEED CONTROL FOR AUTOMOTIVE VEHICLES
Filed July 22, 1937  3 Sheets-Sheet 3
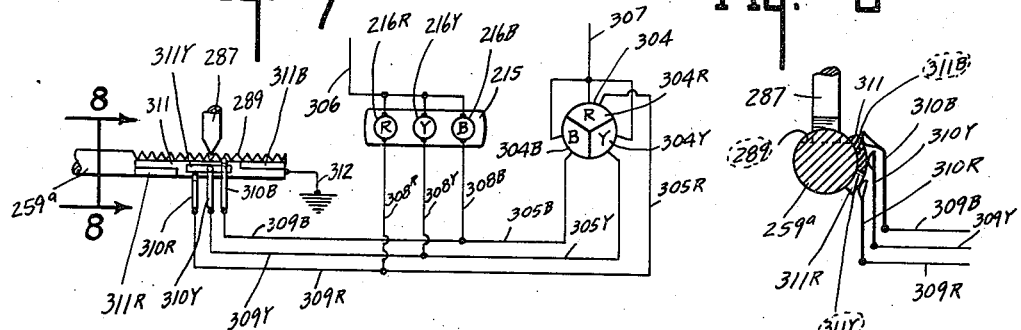
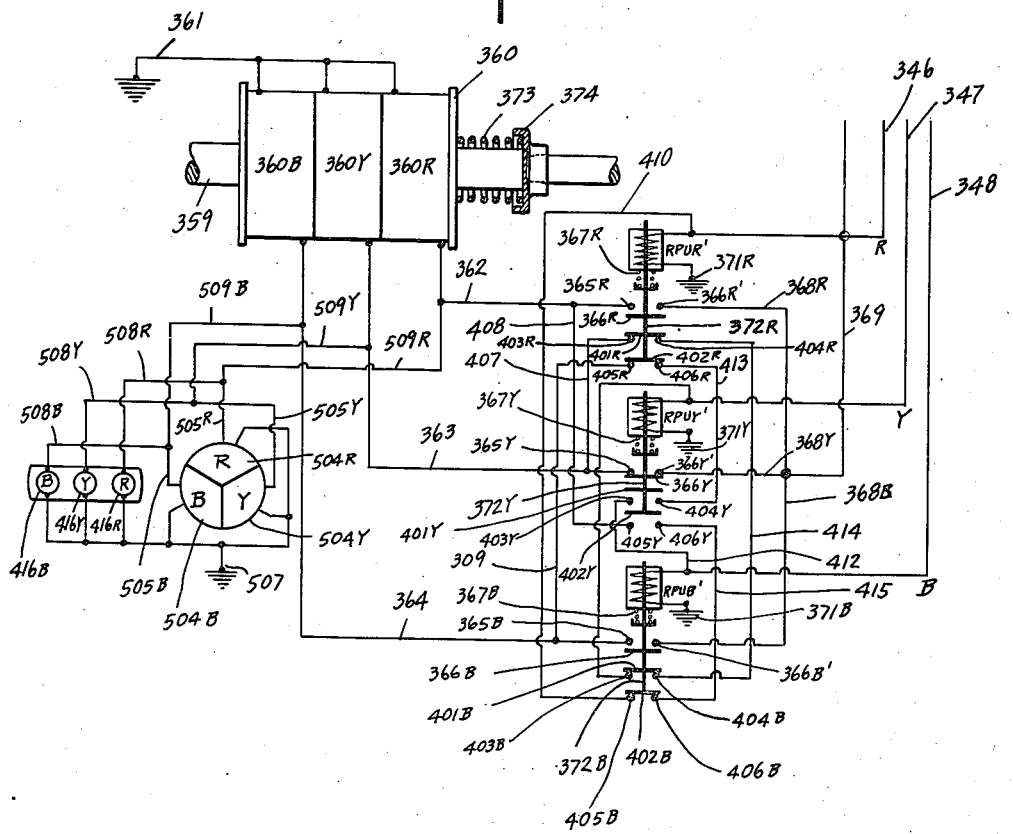
INVENTOR.
ELMER L. GOLDSMITH,
BY
ATTORNEYS.

Patented July 23, 1940

2,209,158

UNITED STATES PATENT OFFICE 2,209,158

AUTOMATIC SPEED CONTROL FOR AUTOMOTIVE VEHICLES

Elmer L. Goldsmith, Indianapolis, Ind., assignor to Zone-O-Trol-Pierce, Inc., Anderson, Ind., a corporation Application June 22, 1937, Serial No. 155,090

1 Claim. (Cl. 177—311.5)

This invention relates to a traffic control system for self-propelled vehicles which are not confined to a predetermined pathway such as rails, but which are of automobile type such as pleasure cars, busses and trucks, although certain features of the invention by slight modification may be applied to trolley type busses.

One object of the invention is to automatically regulate vehicle speed in accordance with traffic conditions by zoning the highways and roadways and automatically imposing upon the vehicle, independent of driver control, a control corresponding and responsive to the zone designation.

Another object of the invention is to zone highways and roadways in such a manner that the zoning means does not constitute an impediment, hazard or obstruction to normal vehicle driving thereon.

A further object of the invention is to zone highways and roadways in an economical manner, to-wit, such that no mechanical, magnetic or electrical highway equipment is requisite for such zoning, and the means used may be easily and economically maintained in operative condition.

The chief feature of the invention consists in zoning highways and roadways, providing on self-propelled vehicles using the same zone operable control means for regulating engine or vehicle speed, as desired, and having the same automatically responsive to such zoning at all times.

In the patent issued to John J. Huebscher, November 5, 1935, No. 2,019,976, there is disclosed broadly the idea of the utilization of color on a pavement for indicating a zone of traffic on a highway travelled by automobile. This patent also shows mechanical and electrical means installed as part of highway equipment for imposing automatic control upon a vehicle equipped with a control device responsive to such imposed control.

The chief objection to this system as disclosed therein is, as indicated hereinbefore, as follows:

The automatic control imposing mechanism requires special installation in a highway or adjacent thereto and is subject to the usual high cost of repair and replacement when damaged or destroyed in addition to the relatively great expense of the original installation.

The application of John J. Huebscher, Serial No. 59,639, filed January 17, 1936, now Patent No. 2,070,432, dated February 9, 1937, discloses the application of color to a pavement for zoning the same. This application also discloses the provision of suitable roadside signals illuminated or otherwise for indicating color designations and, therefore, zones on the highway.

The latter has the inherent disadvantage common to the patent disclosure in that the original cost of installation is relatively high. The application of color for zoning purposes, however, is shown in this application but it is associated with a system of vehicle control which must be manually actuated by the vehicle driver in accordance with the zone indication. This has the disadvantage or objection that the vehicle driver, if not so disposed, need not impose this control upon the vehicle he is driving.

The present invention is directed to a highway control system which requires only the application of paint to the highway as original equipment for zoning and signalling and which requires retouching or repainting for reconditioning the same, and furthermore which paint reflects a color which, when associated with a control embodied in the automotive vehicle, is automatically picked up by said control and the zoning indication is imposed upon the vehicle.

The present disclosure represents but one form of the invention and a relatively simplified form thereof.

Other and more complicated forms have been devised and portions of such modified forms are illustrated and described herein.

The invention is illustrated and described as applied to an independent automatic control for automatically regulating the fuel supply to the engine of the vehicle which control is in addition to the usual manual throttle control but it is so arranged that manual operation of the throttle cannot obtain greater engine operation than that for which the automatic control is set.

A modification of the aforesaid is the addition of a cooperative connection between the manual control and the automatic control, which connection may be of either of two characters, as desired. One such connection includes the provision of a control automatically responsive to vehicle speed which would modify the automatic zoning control, depending upon load and road conditions which may be briefly explained as follows:

A device responsive to vehicle speed only would modify the highway zone control imposed automatically to the extent that if a certain zoning control were imposed automatically and the heavily loaded vehicle were pulling a hill, this automatic zoning control arrangement would have an auxiliary arrangement providing for the additional supply of fuel in accordance with the speed control. In this way the driver of the vehicle would operate at wide open throttle whenever his load and road conditions were such that his vehicle speed would not exceed the predetermined zone speed.

The second form of this modification which, however, is not as desirable as the first, is to have the speed indication auxiliary control responsive to engine speed. Such a device essentially would consist of a centrifugal governor of any conventional type which would impose its control upon the fuel supply directly or upon the automatic zoning control directly and, therefore, on the fuel supply indirectly so that additional fuel could be obtained when the engine speed is below that corresponding vehicle speed for which the automatic zoning control has been conditioned.

Other objects and features of the invention will appear more fully hereinafter in the following description.

The full nature of the invention will be understood from the accompanying drawings and the following description and claim:

In the drawings,

Fig. 1 is a plan view of a highway illustrating three different zones thereof, to-wit, urban, suburban and rural, provided with conventional color indications on the pavement of red, yellow and blue, respectively, and these representing low maximum speed, medium or moderate maximum speed, and substantially unrestricted speed corresponding, for example, to 25, 40 and 60 miles per hour.

Fig. 2 is a diagrammatic view of a major portion of the electrical connections embodied in the control on a self-propelled vehicle, parts of the vehicle associated therewith also being included in this diagrammatic figure together with a diagrammatic representation of a highway signal.

Fig. 3 is a perspective view of a portion of the vehicle and highway immediately associated therewith being shown in section, the former being shown provided with the signal initiating and "pick-up" portions of the system and the latter with the signal portion of the system.

Fig. 4 is a wiring diagram in conventional form of a portion of the system diagrammatically illustrated in Fig. 2 but showing the same in the position corresponding to the highway condition where normally all three signals would be picked up as might be the condition on a white concrete pavement with the sun shining directly thereon.

Fig. 5 is a view similar to Fig. 4 but illustrates the same portion of the system under such conditions as applied to a black pavement, such as asphalt or "black top," or other equivalent pavement which is black or relatively dark and which has thereon no color zoning signal indication.

Fig. 6 is a central sectional view through one of the dash pots embodied in one form of the invention.

Fig. 7 is a view similar to Fig. 2 and of a modified form of a portion of the form of the invention illustrated in Fig. 2, the remainder of the control being omitted.

Fig. 8 is a section taken on line 8—8 of Fig. 7 and in the direction of the arrows.

Fig. 9 is a diagrammatic view of a portion of the invention illustrating a modification thereof wherein the moving power is utilized as the holding power between reception of successive signals.

In Fig. 1 of the drawings, there is illustrated a vehicle roadway or highway 10 which from left to right leads into a suburban section and then passes into an urban section. The highway is intersected as at 11 and there may be a T-road as at 12. The highway is shown as of two-lane character, in which a center strip may be provided and consequently, it is shown dotted herein and indicated by numeral 13. The highway is provided with spaced diagonal colored lines or rather areas, the selected colors representing different zones of the roadway and the letters H, M and L indicating high speed color signals on the highway, medium or moderate speed signals and low speed signals, respectively. Solid areas may be employed.

Merely representative, in Fig. 1 there is illustrated the use of blue as a color signal for indicating the beginning of a high speed zone. The yellow color signal indicates the beginning of a moderate speed zone. The red color indicates the beginning of a low or slow speed zone.

As stated initially, herein, the control devices on the vehicle, one of which is shown in Fig. 1 and indicated by the numeral 14, may be set so that these color or zone signal indications insure predetermined maximum vehicle speed limitations of, for example, 25, 40 and 60 miles per hour, respectively.

Reference will now be had to Fig. 3, and in this figure there is illustrated a portion of the vehicle 14, the numeral 10 indicating a portion of the highway, and there is further illustrated the color strips M which are yellow in color and constitute the signal arrangement.

Fig. 3 illustrates the "pick up" portion of the control system and herein the same is shown positioned under the left rear fender of the vehicle, although any other desired positioning may be provided. On the left rear fender and visible from the front and rear, there is conventionally illustrated a bracket 15 which mounts three lamps 16 which may be of the same or different colors and reference will be had more particularly thereto hereinafter. As stated, other signals may be provided forwardly on the vehicle and rearwardly in place of the two-way visible signals 16. This external signalling from the vehicle is old per se in the art.

W17 indicates a suitable light source which constitutes the vehicle carried initiating portion of the system and which throws white light downwardly on to the pavement, as indicated diagrammatically by the line 18 and the pavement reflects this light upwardly as at 18a. Since the color stripes M in Fig. 3 are shown as yellow and since opaque objects appear in the colors, they reflect, the yellow stripe on the roadway will reflect a preponderance of yellow rays therefrom and derived from the main light source W17, and these reflected rays will be projected on to a unit 19 which contains three different color signal reception devices, designated RPE, YPE and BPE, since for an explanation of this invention it has been arbitrarily assumed that red, yellow and blue will be the three colors utilized. Of course, a greater or lesser number of colors may be employed but in a zoning system, two or more colors preferably should be employed. The designation PE stands for photo electric unit. The provision of unit W17 upon the vehicle insures that in the preferred form of the invention no energy is required for highway signal maintenance or illumination.

As previously stated, the main signal source W17 and the unit 19 containing the three photo electric units may be positioned on the vehicle wherever required. It might be added the reason it is shown positioned in longitudinal alignment with one of the rear wheels is that in those localities where there is considerable snow and ice that accumulates on the pavements during certain seasons of the winter the color signal on the pavement will be exposed long before the entire pavement is clear of snow and ice, due to tire wear.

Furthermore, positioning this portion of the control in longitudinal alignment with one of the rear wheels insures that the dark streak in the highway, due to oil and grease drippings and the like, has no effect on a signal control if the vehicle is being driven in the normal traffic lane.

If desired, in order to prevent mud and the like from being thrown by the rear wheel so as to cover the light source W17 and the "pick up" unit 19, there may be provided a flexible guard 20. It is also to be understood the positioning of the parts shown in Fig. 3 may be changed, for example, so as to be carried by the undersurface of the running board 21 and suitably protected fore and aft by guards 20 or the like.

Reference will now be had to Fig. 2. In this figure 22 indicates the conventional source of power on a vehicle 14. The same is herein illustrated as the battery of the vehicle grounded to the frame as at 23. The switch 24 controls a light circuit 25 of which only a portion is illustrated, and any desired lighting system may be embodied therewith. Line 26 is controlled by the ignition switch 27 and has a branch 28 leading to the engine ignition circuit of whatever character desired. A line 29 is a branch of line 26 controlled by ignition switch 27 and a branch 30 thereof supplies the light source W17 with energy. The light source W17 is grounded as at 31 through an adjustable resistance 32 so that the amount of light discharged from the light source W17, and which is preferably a white light or the equivalent, may be regulated in the initial installation of the control and thereafter sealed against tampering. Thus the light W17 always is energized when the ignition circuit is closed to permit vehicle movement.

Another branch 33 of line 29 supplies by branches 34 current to each of the photo electric units which operate as light switches. Each photo electric unit has positioned ahead of it a coolr filter designated by the letter F and preceding the same is a lens designated by the letters LS. The purpose of the lens is to pick up the light rays reflected from the pavement 10 when the light rays 18 are reflected especially from the color stripe thereon.

The purpose of the color filter which may be of glass or other suitable character, is to prevent passage of light rays to the respective photo electric cell, except for that color for which the photo electric cell has been determined it should be responsive to. It is not known whether there are commercially available photo electric cells that are selectively responsive to individual colors and non-responsive to all other colors and, therefore, the employment of the concentrating lens and the employment of the color filter is embodied herein so that the color designated photo electric cell corresponding to the color of the road signal, will be energized when the light from the light source W17 is reflected thereto.

In the upper right hand portion of Fig. 2 is illustrated a switching arrangement arranged in three groups, since three colors, as it were, have been illustrated in the present embodiment of the invention.

A relay RC is connected by the line 35R to the red photo electric cell RPE and the relay is grounded to the frame as at 36. Similarly, the relay YC is connected by the line 35Y to the yellow photo electric cell YPE, and is grounded to the frame as at 36. Similarly, relay BC is connected by the line 35B to the blue photo electric cell BPE and grounded at 36. Grounds 36 may be a common ground, if desired. Each relay is adapted to move its core 37 when energized and in opposition to its spring 38 which, when the relay is deenergized, returns the core to the original position and into engagement with its stop 39.

Associated with the relay RC are three switches having relatively stationary contacts R1, R2 and R3 connected by line 40a to the line 33. The core 37 of the red relay RC is insulatably connected to the three respective cooperating, relatively insulated contacts R1', R2' and R3', and are simultaneously movable by and with the core 37 of the red relay when the red relay is energized.

In a similar manner, there is provided for the yellow signal arrangement, the relatively stationary contacts Y1, Y2 and Y3 and the cooperating contacts Y1', Y2' and Y3' carried by and movable with the core 37 of the yellow relay YC normally constrained toward its original position by the spring 38 and into engagement with the stop 39.

In a similar manner, a third group of switches is provided for the blue relay BC, the relatively stationary contacts thereof being designated B1, B2 and B3, and the complementary cooperating contacts being designated B1', B2' and B3', the latter being supported by and movable with the core 37 of the blue relay BC when the latter is energized and movable therewith by the spring 38 into engagement with the stop 39 when deenergized.

The switch contact R1' is connected by the line 40 to the contact Y2'. The switch contact R2' is connected by line 41 to the switch contact Y1'. The switch contact R3' is connected by line 42 to the switch contact Y3'. The line 43 connects switch contact Y1 to the switch contact B3. The line 44 connects the switch contact Y2 to the switch contact B2. The line 45 connects switch contact Y3 to the switch contact B1.

It will be observed that when all relays RC, YC and BC are deenergized, that all of the switches R1—R1', Y1—Y1' and B1—B1' are in open circuit position and switches R2—R2', R3—R3' and Y2—Y2', Y3—Y3', B2—B2' and B3—B3', all are in closed circuit position. This condition is more or less diagrammatically illustrated in Fig. 5 which is a representation of this portion of the system when it is receiving no signal indication from the roadway as, for example, when the road is of "black top" character without color zoning thereon even though light W17 be directed thereon.

If it be assumed a condition should arise wherein, due to the intensity of the sunlight or light from source W17 and the vehicle be upon a white pavement, there is reflected into all the photo electric "pick-up devices" all three signals, then this portion of the circuit is conditioned as shown in Fig. 4, to-wit, switches R1—R1', Y1—Y1' and B1—B1' are closed. Since it is noted that in each group of three switches one is normally closed and the other two normally opened or vice versa, it is quite evident, as appears from Fig. 4, that no current is supplied by the photo electric "pick-up" devices to the lines 46, 47 and 48, connected respectively to the switch contacts B2', B3' and B1', because in the blue switch series, the two right hand switches are open and in the yellow series the last right hand switch is open, even though the first or left hand switch of the blue series is closed. Thus no energy is supplied to any line 46, 47 or 48. However, it is to be noted that the intensity of the light source W17 may be so increased (see resistance 32) and the filtering of the reflected light be of such character that normal sunlight reflected from a white road will not result in energization of all photo-electric controls.

In Fig. 5 it will be quite apparent all of the first left hand switches of the three color groups remain in open circuit position under this condition where no signal indication whatsoever is received by any of the photo electric "pick up" devices so there is no current supplied to any one of the lines 46, 47 and 48. When the condition is obtained as represented by Fig. 3, to-wit, the vehicle is passing over a yellow signal indication, the yellow control relay YC is energized and its core is moved to the left in opposition to spring 38 and this closes the left hand switch of the Y series and opens the middle and right hand switches of that series, see Fig. 2. The circuit up to this point is then as follows:

From the source 22 through lines 26 and 29 conditioned by switch 27, thence through line 33 and branch 40a to the switch contact R2, thence by line 41 to switch contact Y1' and from switch contact Y1 by line 43 to switch contact B3 and thence through contact B3' to the line 47.

In a similar manner, it will be noted that the blue signal will be translated into proper control for supplying electrical energy to line 48 and in a similar manner, a red signal will insure electric current to line 46. These three lines 46, 47 and 48 constitute the main control lines and it will be noted that the power conveyed thereby is not that derived from the source of energy through the photo electric "pick up" devices as a series circuit arrangement but it is that derived through such devices as an auxiliary arrangement so that the photoelectric devices when conditioned for operation, need only be of sufficient capacity for operation of the respective relays designated by the appropriate letters RC, YC or BC. Thus, any required amount of power may be supplied to the lines 46, 47 and 48 and independent of the capacities of the photo electric units.

Reference will now be had to the lower left hand portion of Fig. 2. The numeral 49 indicates the intake to the internal combustion engine of the vehicle; 50 indicates an adaptor insert interposed between the intake and the carburetor. Herein the arrangement is illustrated as of the updraft type, and a portion of the carburetor is indicated by 51. The position of the intake and the carburetor may be reversed. There is shown herein, merely for illustration purposes, a manually operable control valve 52 operable by the member 53, in turn operable by the foot throttle and/or the hand throttle, as is well understood in the internal combustion engine art.

In the adaptor insert 50, there is provided a valve 54 mounted on the shaft 55 which has a lever arm 56 rigid therewith and exterior of the passage and carrying a projection 57 seatable in a slot 58 in the end of the member 59 that projects toward the intake passage portion of the adaptor insert 50 and lies to the arm side thereof as shown in Fig. 1.

Suitably supported adjacent the same is a coil 60 which has three coil portions 60R, 60Y and 60B, each connected to the ground as at 61, and each supplied with power by a line 62, 63 and 64, respectively. Line 62 leads to a stationary switch contact 65R. A switch member 66R is normally constrained into open circuit position by the spring 67R. Line 68R is connected to line 69 in turn connected to line 33.

In a similar manner, the solenoid section 60Y has its supply line 63 connected to stationary switch contact 65Y. Adjacent thereto is the switch 66Y normally constrained into open circuit position by the spring 67Y and the switch is connected to line 69 by the line 68R.

In a similar manner the solenoid section 60B is connected by its supply line 64 to the stationary switch contact 65B. Cooperating switch member 66B is normally constrained into open circuit position by the spring 67B and is connected by the line 68B to the line 69. Suitable open circuit position stops for the switch members may be provided as indicated at 70R, 70Y and 70B, respectively.

The line 46 supplies energy to the solenoid RPUR which is grounded at 71R. A movable core 72R is connected to the switch member 66R and the spring 67R envelopes the same.

In a similar manner, solenoid RPUY is connected to line 47 and is grounded at 71Y. The movable core 72Y thereof is connected to the switch member 66Y and is encircled by the spring 67Y.

In a similar manner, the solenoid RPUB is connected to line 48 and is grounded as at 71B. This solenoid has the movable core 72B which is connected to the switch member 66B and is encircled by the constraining spring 67B thereof.

As shown in Fig. 2, the yellow solenoid RPUY has been energized by current from line 47 and has elevated the switch 66Y so it engages contact 65Y, this supplying energy from the battery 22 or other suitable source of power on the vehicle to the section 60Y of the solenoid 60. This has moved the core 59 of the solenoid 60 to the position as shown and valve 54 to position YV and in opposition to the spring 73 bearing against a seat and retaining member 74 carried by that member. This spring member 73 encircles the member 59 and normally tends to move the core to the low maximum speed position.

The invention so far described is of the instant type and unless there is embodied in the system an additional circuit arrangement which will maintain the respective switches 66 closed after the initial signal is received and retain the same closed until a new signal is received thereby energizing the respective sections of solenoid 60, some other means must be provided to hold the control member 59, which is herein for simplicity shown as an extension of the movable core of the solenoid 60, in the predetermined position corresponding to the signal indication received or picked up by the vehicle.

One mechanical embodiment of such means is herein illustrated. A solenoid 75 is connected by line 76 either to line 69 or directly to the line 33, the former connection being shown herein. This relay is connected by line 77 to a stationary switch contact 78. Another stationary switch contact 79 adjacent thereto is grounded as at 80. A switch member 81 has a stem 82 on it encircled by a spring 83 which normally constrains switch member 81 in addition to gravity, into the open circuit position or non-bridging position.

A solenoid 84 has the respective sections 84R, 84Y and 84B, each connected by lines 85R, 85Y and 85B to the lines 46, 47 and 48, respectively. The respective solenoid sections 84R, 84Y and 84B are grounded as at 86. When the yellow signal indication is received, as before stated, power is supplied directly from the battery to line 47 and the intermediate solenoid section 84Y is energized, closing the switch 78, 81 and 79 to solenoid 75. Thus, at the same time the respective solenoid RPU is energized, the relay 75 will be energized.

The movable core 87 of solenoid 75 is constrained by spring 88 in addition to gravity, into the lower position. An extension 59a of the movable core 59 is provided with a serrated face or formation 89 and the lower end 87a of the movable core or plunger 87 is complementally formed, so as to seat in one of the tooth roots when the solenoid 75 is deenergized.

There is provided on the relay 84 a dash pot structure 90 and there is provided on each of the solenoids RPU a dash pot construction 90R, 90Y, and 90B, respectively.

One embodiment of the dash-pot structure is shown in Fig. 6 to which reference now will be had. In said figure, 82 indicates the movable core of the triple section solenoid 84, which while shown as in superposed relation, is actually wound so that when each section is energized, the member 82 has exactly the same amount of movement, thereby differentiating from the type of movement obtained from solenoid 60 with respect to the movable core 59.

The dash-pot 90 includes a chamber 91 within which is mounted a piston 92 secured as at 93 to the movable core 82 or by any other suitable connection. The upper end of the dash-pot includes an air discharge orifice 94 controlled by a ball 95 backed by a spring 96, the spring and ball being retained in the enlarged portion of the orifice by the perforated cap 97. When the solenoid 84 is energized, the air is forced from the chamber 91 through the port 94, opening of the same being by the air pressure in opposition to the weight of the ball and the force of the light spring.

Suitably secured in the head of the dash-pot 90 is an air supply member 98 having the intake ports 99 and the communicating port 100 which is tapered so as to partially seat, as it were, the needle valve 101 secured in adjusted position as at 102 and locked therein as at 103.

When the solenoid 84 is deeneregized, the piston 92 with the movable core, starts to descend, the ball being seated by its own weight and the spring seals the port 94. The air gradually bleeds into chamber 91 through the needle valve controlled intake 100, thereby insuring the maintenance of the contact between member 81 and the contacts 78 and 79 for a predetermined appreciable period after the electrical energy supplied by the "pick-up" signal through lines 85R, 85Y and 85B, respectively, has terminated. For this purpose, if desired, the member 81 may be of flexible character so that there is an appreciable amount of piston travel in the cylinder 91 before this switch opens. This maintains in closed circuit relation for an appreciable period of this switch, insuring energization for the same period of the solenoid 75 and, therefore, maintains in elevated position the locking plunger 87.

While this plunger is held elevated, the respective circuit for the respective section of the solenoid 60 has also been energized. Through the dash-pots 90R, 90Y and 90B, respectively, the previously energized relay, while deenergized at the same time that the section 84R, 84Y or 84B is deenergized, nevertheless maintains switch member 66R, 66Y or 66B, respectively in contact with the stationary contact 65R, 65Y or 65B, thereby insuring power supply for a predetermined interval to the appropriate section 60R, 60Y or 60B, respectively.

The dash-pots 90R, 90Y and 90B have the same time interval adjustment applied thereto so that they function alike and this common time interval is greater than the time interval for which the dash-pot 90 is adjusted. This in effect makes the respective section of the solenoid 60 operate for a predetermined short interval as a holding solenoid maintaining the member 59 in the appropriate selected position for the corresponding fuel control and before the respective switch 66 is deenergized, the relay 75 will be deenergized and the plunger 87 will engage in the serrated surface 89 to hold the member 59 in the adjusted control position.

This position is maintained mechanically in the present disclosure as described, and held until a new signal indication is received. In the event of failure, it will be noted that switch 81 moves to open circuit position. Member 87 moves to locking position. Member 59 through spring 73 moves to the low speed position. Switch 66 also moves to open circuit position.

Whenever it is desired, there may be provided on the instrument board or at any other suitable location within the vehicle, a signal mechanism which indicates the zone signal or speed for which the control is conditioned. Such a device is conventionally illustrated as a triple divided unit 104 and a line 105R leads to the red portion 104R of such signal device. 105Y leads to the yellow portion 104Y of the device and 105B leads to the blue portion 104B of the device. Thus when the respective inside signal is energized, the driver can note the zone color under which he is then travelling even though he might have forgotten what was the highway zone color imposed by the original signal.

For warning and patrol purposes, the signal 16 has been described as being a series of signals at the front and/or at the rear or visible from either or both directions and the like. Three signals are indicated. 16R is the red signal, 16Y the yellow signal and 16B the blue signal. These signals have a connection 106 with the power from the battery and herein the same is connected to line 76 for such purposes, although the line 106 may be connected directly to line 69 or directly to line 33. In the same manner, the common supply line 107 to the triple divided signal 104 need not be connected to the line 76 but may be connected to the line 69 or line 33, as desired.

Leading from each of the signals 16 are individual lines 108RUB and these, if both exterior and interior signal systems are employed, are connected in multiple with lines 105RYB by lines 109R, 109Y and 109B and to a switch contact 110R, 110Y and 110B, respectively. There is suitably secured to the extension 59a a contactable portion 111 having the offset portions as shown. The member 59a is grounded as at 112. The length and amount of offsetting is such that when the member 59a is under the influence or has been conditioned by section 60B, all three switch members 110 are in engagement with member 111 and thus all three signals 16 are energized and all three divisions of signal 104 are energized.

When the yellow signal has been received, which is the condition in which the invention is illustrated in Fig. 2 but two of the switches 110, to-wit, 110R and 110Y contact member 111 and only signals 16R and 16Y and divisions 104R and 104Y of signal 104 are energized. When the device has been actuated by section 60R of solenoid 60, only switch 110R engages member 111 and only signal 16R and only the red division of the signal 104 is energized.

By reversing the offsetting in member 111 and interchanging switch contacts 110R and 110B (which are of different length, all three signals 16 and/or 104 will be energized at low speed control and only 16B and/or 104B will be energized at high speed control.

Reference will now be had to Figs. 7 and 8. In these figures there is illustrated a modified form of the signal system and numerals similar to numerals employed in Fig. 2 are utilized herein but they are increased by two hundred. In this form of the invention the member 311 carried by the extension 259a is a block of insulation and nested therein in longitudinal and peripheral offset relation are the contacts 311R, 311Y and 311B in electric connection with member 259a grounded as at 312. The contacts 310R, 310Y and 310B are peripherally offset, as shown in Fig. 8 so that for any one of the three positions of the member 259a only one of the contacts or switch members 310 contacts the appropriate or corresponding registering contact segment 311. Each of these contact members 310 is connected by the line 309 to the appropriate line 308 and to the appropriate line 305, thence through the appropriate signal 216 and the appropriate signal section 304, the same in turn being connected to the common supply 306 and 307, respectively. These in turn may be connected either to line 76, 69 or 33 in Fig. 2.

The distinction between these two types of signal indication is that that shown in Fig. 2 insures that when the red signal is energized or a red signal is picked up, but one light is lighted showing the car is travelling at a high speed. When the yellow signal conditions the circuits but two signals are energized and when the blue signal conditions the circuit, all three signals are energized. Of course, if desired, the relative relationship between the member 111 and the switch members or fingers 110 may be reversed so that at high speed one signal may be energized and at low speed all three signals may be energized without departing from the scope of this invention. This arrangement permits the same colored lamps or lights to be utilized since it is the number of lamp units energized which exteriorly gives the zone indication and speed indication or different colored lights or lamps may be employed as well, thus giving both lamp color and number indications of the zone control imposed.

In the form of the invention, however, shown in Figs. 7 and 8, only a single signal, and this of colored character, is provided, the color corresponding or being equivalent to that of the safety zone in which the vehicle is travelling. Any one of these three signal indications may be employed and if desired, the exterior and/or interior signal indication arrangements may be employed or omitted, since primarily the invention is directed to vehicle speed control automatically imposed on the vehicle through roadside or highway signal indication, which indication is of illumination type and is not of electrical, magnetic or mechanical character.

In Fig. 9 is shown a modification of the invention whereby the mechanism for holding the imposed speed control between successive signal receptions which is illustrated in Figs. 2 and 7 as of mechanical type, is replaced by mechanism of electrical character and is further characterized by utilizing the moving means for the control valve actuating member as the holding means as well, and to this extent the present modification is a simplification and is the preferred form of the broad invention.

In Fig. 9 there has not been illustrated the addition of the signal devices for interior and exterior signalling as shown in Figs. 2, 7 and 8 but either modification may be added thereto as desired. If desired a simplification of that shown in Figs. 7 and 8 may be employed as shown in Fig. 9 which form is of selective color signal type, similar to that shown in Figs. 7 and 8 as distinguished from the successive signal type broadly illustrated in Fig. 2.

In Fig. 9 numerals indicating like or similar parts have been increased by three hundred and the letters have the prime designation addition.

It will be understood that the selective power supply lines are designated 346, 347 and 348 for the red, yellow and blue signal operations, respectively. The power solenoid 360 having sections 360R, 360Y and 360B moves the member 359 into selected position corresponding to the section energized by the selected signal circuit. These sections are grounded at 361 and member 359 is constrained by a light spring 373 retained by seat 374 toward the slow maximum speed or red position. This final position need not correspond to the red position but may be such that the fuel controlling valve 54 shown in Fig. 2 will be moved into closed position in the fuel passage in the event of failure. This would stop the vehicle and necessitate the driver locating and repairing the failure.

The system may be sealed in such a manner that to locate and repair the same (except for cell and light failure) breaking of the seal and removal of the cover to obtain access thereto will immediately energize another warning signal, and if the repair could not be made immediately the movable member 359 may be secured in vehicle low speed position to permit further travel to a service station. Such sealing and warning additions are quite common in the art and needs no illustration or further description for those skilled in this art.

As shown in Fig. 2, the power supply line 47 has been connected to the source of power and lines 46 and 48 are dead and line 69 is connected to the source of power. In Fig. 9, lines 369 and line 347 are considered similarly conditioned and lines 346 and 348 remain dead—only of course, until a red or blue signal has been imposed upon the system.

Solenoid RPUY' grounded at 371Y is energized which elevates core 372Y in opposition to light spring 367Y and closes switch 366Y'—366Y—365Y to supply current from line 369 through branch 368Y to line 363 to solenoid section 360Y, grounded at 361.

In a similar manner when line 346 is selectively connected to the power source, power is supplied to solenoid section 360R. Likewise, line 348 supplies power to section 360B.

In each of these instances, the system functions as illustrated in Fig. 2 and as previously described.

Associated with each movable core 372 are two other switch members designated 401 and 402 with the proper letter R, Y or B. Spaced contacts 403 and 404 and 405 and 406 are respectively associated therewith.

Line 407 branches from line 363 and terminates at contact 403R. Line 408 branches from line 362 and terminates at contact 405Y. Line 409 branches from line 364 and terminates at 405R. Line 410 branches from line 346 ahead of solenoid RPUR' and terminates at contact 405B. Line 411 branches from line 347 ahead of solenoid RPUY' and terminates at contact 403B. Line 412 branches from line 348 ahead of solenoid RPUB' and terminates at contact 403Y. Line 413 connects contact 406R to contact 404Y. Line 414 connects contact 404R to contact 404B. Line 415 connects contact 406Y to contact 406B.

With the "yellow'" control imposed, the solenoid RPUY' is energized supplying power to section 360Y and simultaneously through line 407, member 401R, line 414, member 401B and line 411. Thus power is supplied from line 369 to solenoid RPUY' to maintain the latter energized until a different signal control is imposed. In each group of switches two are normally closed and one normally open and upon control imposition, the reverse conditioning occurs.

No further explanation is believed necessary except to state that each solenoid RPU—' may be energized and will be held energized until a new control is imposed, and that the respective section of solenoid 360 will be energized and remain energized until a new control is imposed.

The foregoing system modification accomplishes electrically the holding function between signal receptions, and utilizes the "moving" solenoid as the holding means and thus distinguishes from "common" mechanical type holding of the valve 54 by member 87a as illustrated in Fig. 2.

Leading from each of lines 362, 363, 364 are the lines 509R, 509Y and 509B which selectively supply power to lines 505R, 505Y and 505B and lines 508R, 508Y and 508B to energize the respective signals 516R, 516Y and 516B and 504R, 504Y and 504B all grounded at 507.

While the invention has been described and illustrated in great detail in the foregoing description and the drawings, respectively, the same, as has been repeatedly stressed, is merely an exemplification of the broad invention, and such description and drawings are to be considered as illustrative and not restrictive in character.

The various modifications hereof which have been illustrated and/or described herein as well as others which have been pointed out as possible modifications, together with those which will readily suggest themselves to persons skilled in this art, are all considered to be within the broad scope of this invention reference being had to the appended claim.

The invention claimed is:

In a highway traffic control system, a plurality of different permissive maximum speed zones, each speed zone having a different color indication, a plurality of selectively color responsive photo-electric cell devices, corresponding to the number of different speeds and color indications employed, an electric operable device for each cell device, a group of switches for each electric device, each group including individual switches equal to the number of cell devices, all switches but one in each group being normally of closed circuit character and the remaining one being normally of open circuit character; all switches of the group being movable into opposite circuit position upon electric device operation, series circuits each including a normally open switch of one electric device and a normally closed switch of each other electric device, and selectively operable means of the vehicle controlled by the respective series circuits when closed.

ELMER L. GOLDSMITH.